United States Patent [19]

Adair et al.

[11] 4,084,200

[45] Apr. 11, 1978

[54] MAGNETIC DISC CARTRIDGE

[75] Inventors: Henry Adair, Mission Viejo; Dean Lester Christensen, La Mirada; Leon Harold Specktor, Los Angeles, all of Calif.

[73] Assignee: Memorex Corporation, Santa Clara, Calif.

[21] Appl. No.: 708,534

[22] Filed: Jul. 26, 1976

[51] Int. Cl.² ............................................. G11B 11/02
[52] U.S. Cl. ..................................... 360/133; 360/60
[58] Field of Search ................. 360/133, 135, 97, 99, 360/60; 206/444, 309

[56] References Cited

U.S. PATENT DOCUMENTS

| | | | |
|---|---|---|---|
| 2,612,565 | 9/1952 | Heller | 360/60 |
| 3,199,091 | 8/1965 | Barkhuff et al. | 360/60 |
| 3,526,884 | 9/1970 | Buslik et al. | 360/133 |
| 3,800,325 | 3/1974 | O'Brien | 360/133 |

Primary Examiner—John H. Wolff
Attorney, Agent, or Firm—Limbach, Limbach & Sutton

[57] ABSTRACT

A cartridge for holding and protecting a recording disc during storage and use is disclosed in which a recording head access door for providing access to the disc within the cartridge is attached to the cartridge housing by a hinge pivotally operable about a predetermined axis.

7 Claims, 9 Drawing Figures

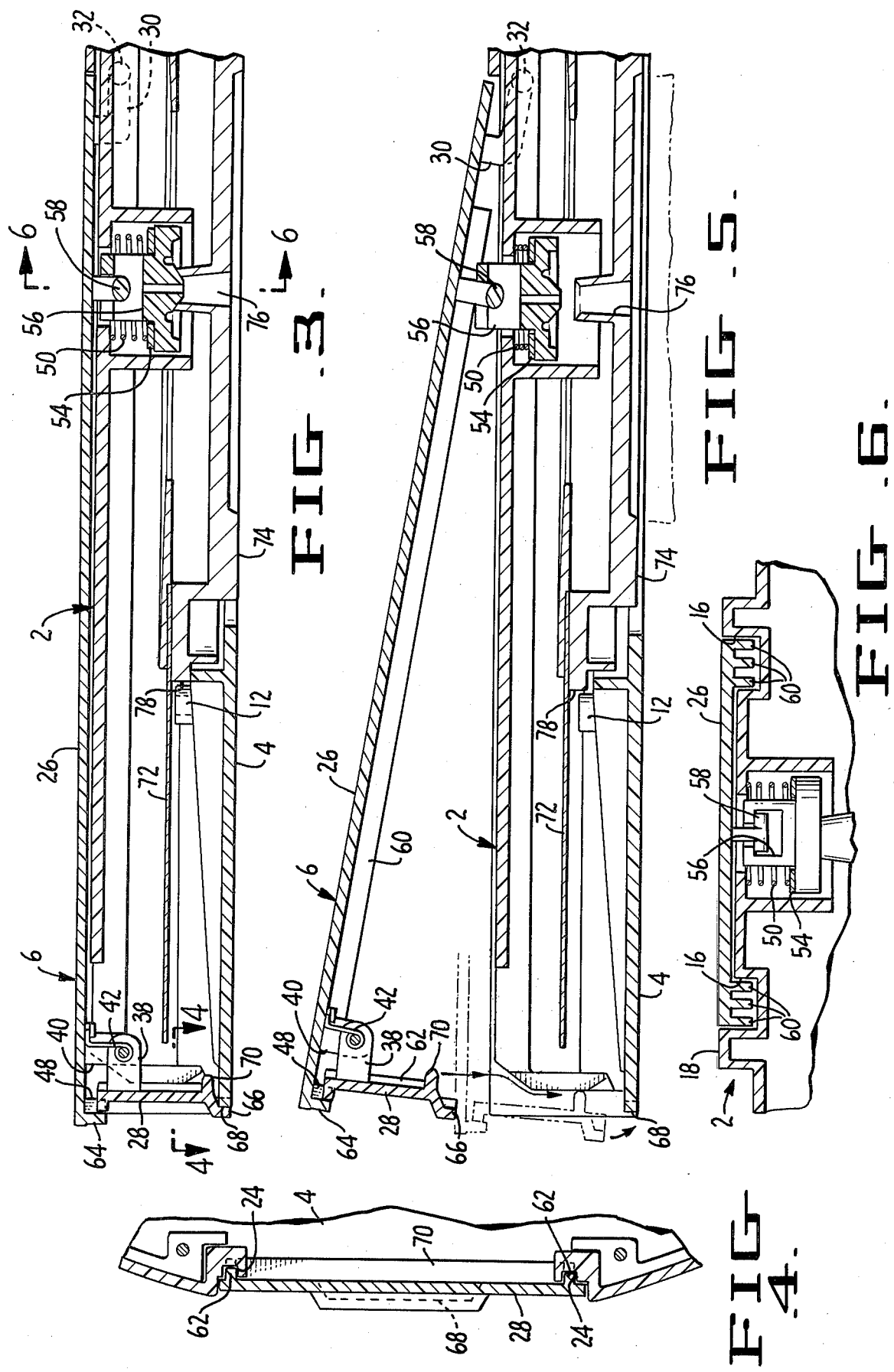

MAGNETIC DISC CARTRIDGE

BACKGROUND OF THE INVENTION

In the field of data processing equipment magnetic recording discs have long been used for providing readily accessible external data storage. Such discs have conventionally been used with suitable drive and recording apparatus and are generally made readily removable from such apparatus. To provide for accurate, high-density recording of data on such recording discs it has generally been found necessary to provide recording and reading heads extending inwardly of the periphery of the disc and spaced a very few thousandths of an inch above the surface of the disc. Because of this close head to disc spacing it is necessary that the surface of the disc be maintained essentially free of external contaminants such as dust and dirt. The presence of even tiny dust or dirt particles on the surface of the disc could result in interference between the dust particles and the disc and recording head, thus resulting in what is commonly known as "head crash". Such an undesirable condition could result in either damage to the recording head or distortion of the data recorded or read.

To maintain the surfaces of these magnetic recording discs substantially free from such contaminants while still providing for access of the recording head to the disc within the cartridge, disc-enclosing cartridges having a variety of recording head access doors and dust seals have been devised. Conventionally, the head access doors have comprised two plastic members, a first member of substantial elasticity attached to and extending across the top of the cartridge and a second member, or outer door, resiliently attached to the first member and extending downwardly across the opening in the side of the cartridge. Conventionally, the first member extending across the top of the cartridge has been rigidly attached at its end opposite the outer door, to the top of the cartridge, the flexibility and resilience of the plastic member enabling it to be deflected upwardly for opening to gain access to the disc within. Also conventionally, the outer door has been attached to the outer extremity of the first member by a flexible resilient device such as a strip of beryllium copper, thus enabling the outer door to be deflectd outwardly away from the edge of a cartridge while resiliently urging the outer door inwardly toward the edge of the cartridge. In such prior art cartridges the lower portion of the outer door has been dimensioned and configured to bring it close to, but out of, engagement with the adjacent portion of the cartridge. To close the cartridge against external contaminants, such as dust, a dust seal has conventionally been provided in the form of a thin, resilient plastic membrane extending between the lowermost portion of the outer door and the adjacent portion of the cartridge, the resilient urging of the outer door inwardly against the cartridge edge causing this thin plastic membrane to be deflected and thus to effect a dust seal against the adjacent cartridge portion.

Such conventional recording disc cartridges have suffered several significant problems and have been unable to maintain their dust sealing capabilities over an extended period of usage. Among these problems has been a permanent plastic set in the access door first, or upwardly facing, member caused by frequent and sometimes extended deflection of this resilient plastic member during access to the recording disc. When such a set occurs in the access door member, the portion of this member to which the outer door is attached may tend to be bowed upwardly, thus no longer bringing the bottom of the outer door down into dust-excluding contact with the cartridge. Additionally, the non-pivoting, deflecting type of hinge joining the outer door to the transversely extending door may also fatigue or take a set such that the outer door is no longer adequately urged inwardly toward the cartridge to effect the desired dust seal. Yet another problem arises from the thin membrane-type seal used at the bottom of the outer door. As with the other plastic members, this membrane, after prolonged engagement with the adjacent cartridge portion and especially under conditions of elevated temperature, may also take a set such that its previous resilience no longer functions to urge the membrane firmly against the cartridge, as is required to form a proper dust seal.

Another problem encountered by conventional disc cartridges as related to the selectively positionable reset button provided in the lower surface of the cartridge to protect against accidental erasure and unintended recording on the disc. In the conventional cartridge the reset button has been configured such that it may assume an extended, or protecting, position only when located in one of two relatively precise rotational positions. If the button is pressed inwardly and rotated to any position other than such two relatively precise locations, the button will tend to remain in its retracted, non-protecting position. Thus, accidental contact of the button may unintentionally cause it to assume its unprotected position, permitting unintended erasure of previously recorded data.

SUMMARY OF THE INVENTION

In view of the above described deficiencies of the prior art devices, it is an object of this invention to provide a cartridge for a magnetic recording disc having an improved door structure to facilitate ease of operation while improving its sealing capabilities against external contaminants. More specifically, it is an object of the present invention to provide improved means for hingedly attaching the head access doors to the cartridge and to provide improved sealing means between said doors and said cartridges. It is a further object of this invention to provide such an improved cartridge having an improved reset button which will tend to assume its extended, protecting position unless placed in a retracted, non-protecting position by relatively careful resetting.

This invention contemplates a cartridge for holding and protecting a recording disc during storage and use which includes a lower cartridge housing member extending generally transversely of the recording disc axis, and upper housing member joined to the lower housing member and including an upwardly facing portion extending transversely of the recording disc axis and an edge portion extending downwardly from the periphery of the upwardly facing portion to the lower housing member, a recording head access door movable between a closed position and an open position, and a hinge pivotally operable about a predetermined axis for attaching the recording head access door to the upper housing member. The upper housing member further includes an opening through its edge portion for access by a recording head to the disc within. The recording head access door in its closed position extends transversely across a part of the upwardly facing portion of the upper housing member, and downwardly across and covering the recording head access opening. In its open position the recording head access door is deflected pivotally upwardly from the upper housing member to expose the recording head access opening.

BRIEF DESCRIPTION OF THE DRAWINGS

FIG. 3 is a section taken through the cartridge of FIG. 1 (in assembled condition) along line 3—3;

FIG. 4 is a fragmentary sectional view of the cartridge of FIG. 3, taken along line 4—4;

FIG. 5 is a sectional view of the cartridge of the invention, corresponding to the view of FIG. 3 with the head access door in its open position;

FIG. 6 is a fragmentary sectional view of the central portion of the cartridge of FIG. 3, taken along line 6—6;

DESCRIPTION OF A PREFERRED EMBODIMENT

Figure 1:
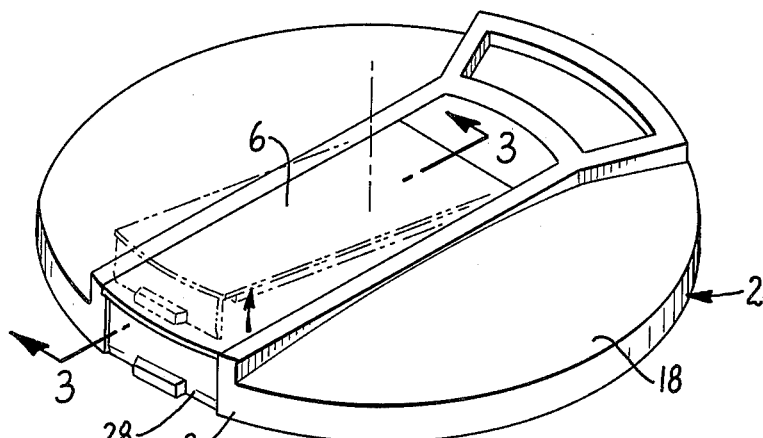
FIG. 1 is an exploded view of the cartridge of this application.

A preferred embodiment of the recording disc cartridge of this invention is illustrated in the exploded view of FIG. 1 in which the upper housing member 2 is illustrated separately from lower housing member 4. In this illustration the recording head access door 6 is illustrated in the solid line representation in its closed position, extending transversely across the upwardly facing surface 18 of the upper housing member 2 and downwardly across part of the edge portion 3 of that upper housing member 2. Also, in this illustration, in the broken line representation, the recording head access door 6 is illustrated in its open position deflected upwardly from the upper housing member 2. For purposes of clarity the actual recording disc has been omitted from FIG. 1. However, the aperture 8 into which a portion of the hub of the recording disc is received is illustrated in the lower housing member 4. Air door 10, of conventional configuration, and bosses 12 for restraining movement of the disc, as described below, are also included in FIG. 1 to illustrate their relationships with the other components of the cartridge. Similarly, the upwardly facing surface 13 of the base of the reset button well (described in detail below) is also illustrated in FIG. 1 to indicate its position and relationship within the cartridge. The upper and lower cartridge housing members, 2 and 4, respectively, conveniently may be attached together by conventional means such as screws projecting upwardly through holes 14 in the lower housing member 4 into upper housing member 2.

Figure 2:
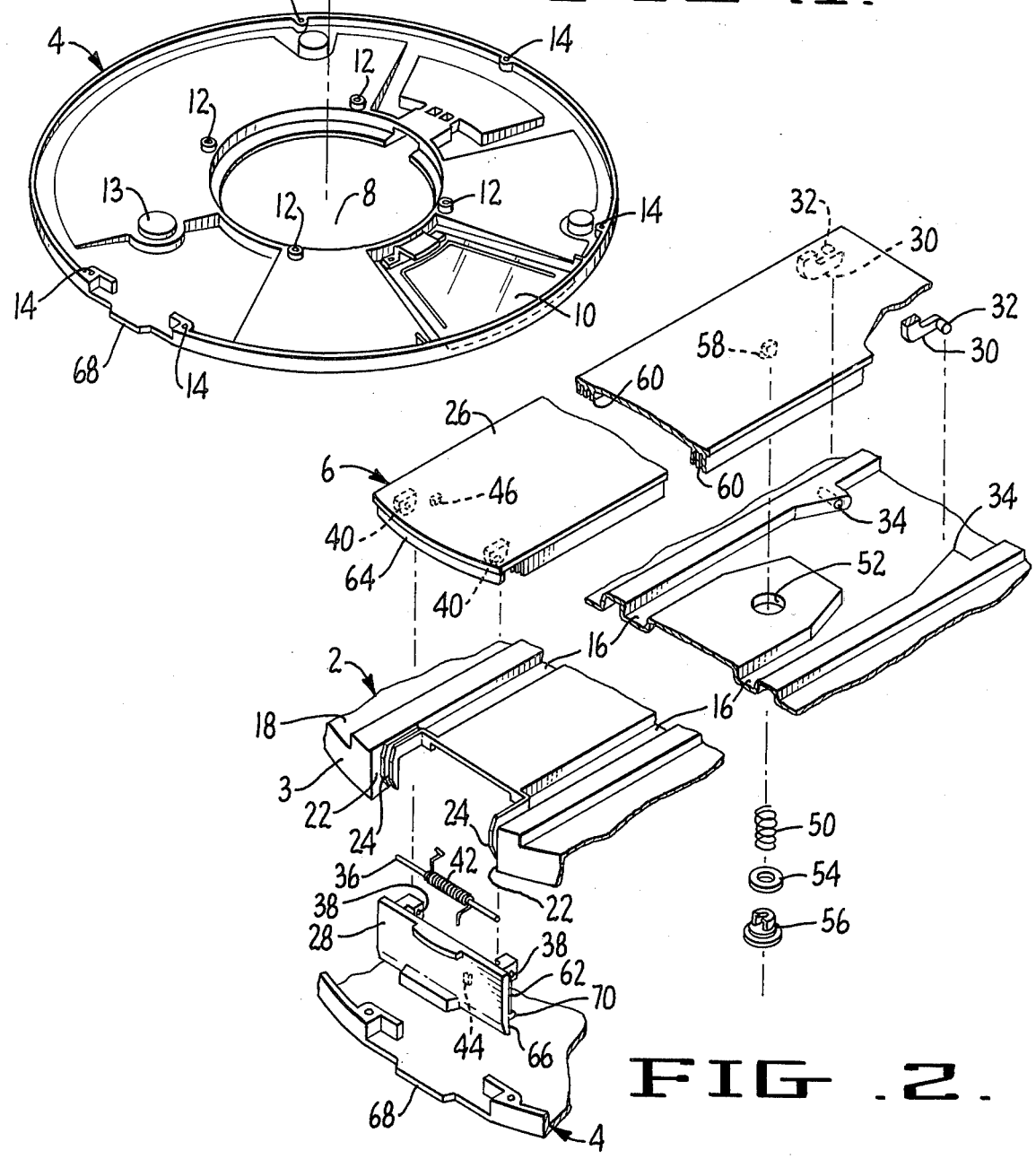
FIG. 2 is an exploded view of the recording head access door of the cartridge of FIG. 1.

The recording head access door and the portions of the housing members 2 and 4 associated therewith are illustrated in greater detail in the exploded view of FIG. 2. In this illustration may be seen the configuration of upper housing member 2 adjacent the head access door 6. This configuration includes the channels 16 extending along the upwardly facing surface 18 of the upper housing member and the surfaces 22 adjacent and defining a recording head access opening, and sealing channels 24, for purposes to be described below. Similarly, the details of the lower housing member 4 adjacent the head access opening are illustrated in FIG. 2.

In FIG. 2 it may also be seen that the access door 6 further comprises an upper portion, or upper door, 26 and an outer portion or outer door 28. Both of these portions 26 and 28 suitably may be formed of a plastic material such as a General Electric Polycarbonate No. 101 having approximately 20% glass fiber filling for additional strength and rigidity, while the cartridge upper and lower housing members suitably may be formed of the same polycarbonate material without the glass fiber filling. The upper door 26 includes a pair of hinge members 30 molded integrally with the door and having coaxial pivot pins 32. These pivot pins 32 are received by snapping into pivot bearings or holes 34 formed in the upper housing member 2. Thus, the upper access door 26 is pivotally attached to the upper housing member for pivotal movement about the single rotary axis defined by the pivot pins 32 received into the holes 34.

Also illustrated in detail in FIG. 2 is outer door 28 which is pivotally attached to upper door 26 by means of a shaft 36 which projects through holes in bosses 38 molded integrally with the outer door, and also through holes in bosses 40 molded into the outer end portion of upper door 26. By means of this shaft connection the outer door 28 is pivotally joined to upper door 26 and may move pivotally about the single rotary axis defined by shaft 36. A torsion spring 42 coiled about shaft 36 engages at one end boss 44 molded into outer door 28. The opposite end of spring 42 engages a tab or boss 46 molded into upper door portion 6, such that the spring resiliently urges the outer door 28 to pivot inwardly of the cartridge about the pivot axis defined by shaft 36. Such inward pivotal movement of the door 28 is limited either by abutment of the door against the cartridge lower housing member 4 (when door is closed), or by engagement of the door 28 with stops 48 (when door is open), as illustrated in FIGS. 3 and 5.

The combination door closing and disc retaining spring and hub assembly may also be seen in FIG. 2. This assembly comprises a coil compression spring 50 with one end acting against the underside of the upper housing member 2 adjacent the aperture 52, with the opposite end of the spring acting against washer 54 which, in turn, acts against disc hub retainer 56. Upon assembly, the spring 50, washer 54 and retainer 56 are assembled together with the uppermost portion of retainer 56 projecting through hole 52 and engaging tab 58 molded integrally with the underside of upper access door 26, as illustrated in FIGS. 3, 5 and 6. Thus, the action of the compression spring 50 against the underside of upper housing portion 2 and the washer 54 and retainer 56 tends to urge the upper access door portion 26 pivotally downwardly into engagement with upper housing member 2, as illustrated in FIGS. 3, 5 and 6.

The manner in which this improved cartridge and its recording head access door sealed against intrusion of external contaminants may be seen with reference to FIGS. 2 through 6. In FIGS. 2 and 6 are best seen the sealing arrangement between upper access door portion 26 and the upper housing member 2. This sealing arrangement comprises essentially the cooperation of the reinforcing rib 60 extending longitudinally of upper door 26 with the channels 16 formed in the upwardly facing portion 18 of upper housing member 2, thus forming a simple labyrinth seal.

A more important feature, and one of the substantial benefits of this invention, is the improved sealing arrangement of the outer door 28 across the end of the recording head access opening. The inwardly facing portion of door 28 includes a pair of ribs 62 extending generally vertically and adjacent the lateral extremities of the door 28. When the door is in its closed position, these ribs are received into channels 24 formed in the edge portion 3 of the upper housing member (FIG. 2), thus forming another simple labyrinth seal. External contaminants are generally prevented from entering at the pivotal joint between outer door 28 and access door portion 26 by the overlap of the lip 64 over the top portion of the outer door 28, as is best seen in FIGS. 3 and 5.

The seal between the lowermost portion of outer door 28 and the adjacent portion of the cartridge housing is illustrated most clearly in FIGS. 3 and 4. As indicated, the lowermost portion 66 of the outer door 28 is configured to overlap and matingly abut the adjacent radially outermost portion 68 of the lower housing member 4. The action of torsion spring 42 on outer door 28, described above, urges the door 28 to rotate about shaft 36 in a direction counterclockwise in FIG. 3, thus urging door portions 66 against lower housing portion 68 to effect a seal. The seal is enhanced by the overlap of transverse, inwardly projecting lip 70 over the radially outer portion 68 of the lower housing member, thus creating an additional barrier to the entry of external contaminants such as dust. Thus, it may be seen that by this overlapping and abutting seal between the outer door 28 and the lower housing member 4 a relatively tight seal may be effected by the action of the torsion spring 42, and no longer is dependence upon a thin resilient membrane necessary, as with the prior art.

An additional feature of this improved cartridge is the provision of positive means for restraining an axially transverse movement of the recording disc, such as may happen during handling or storage, when the disc is not received and centered upon the drive spindle of a recording or playback unit. The members comprising this disc movement restraining means are the plurality of bosses 12 projecting upwardly from the upwardly facing portion of the lower housing member 4, as illustrated in FIGS. 1, 3 and 5. It may be noted that FIGS. 3 and 5 illustrate not only the cartridge housing but also the inclusion of a conventional magnetic recording disc 72 mounted upon a hub 74. In a conventional manner, the previously described spring loaded retainer 56 may bear down against the hub 74 within the spindle aperture 76 whenever the recording head access door 6 is in its closed position (FIG. 3). The action of this spring loaded retainer 56 against the hub 74 of the disc provides for some restraint against movement of the disc transversely of its axis. However, if the disc is jolted, the weight of the disc and hub may still cause it to move despite the spring-biased centering pressure of retainer 56. Accordingly, in the cartridge of this invention are provided a plurality of disc movement restraining bosses 12 positioned adjacent the aperture in lower housing member 4, through which the disc hub 74 projects. These bosses 12 are spaced radially from the center of the aperture a distance slightly greater than the outermost extremity 78 of the disc hub 74. Thus, when the disc is held centrally either by the action of a drive spindle or by the spring bias retainer 56 the bosses 12 will be spaced slightly from the edge 78 of the disc hub. However, if the disc were moved in a direction transversely of the axis, such as by a shock during handling, the outermost portion 78 of the hub would engage one or more of the bosses 12, thus restraining any such axially transverse movement and preventing damage to the disc such as might occur if it were to strike the inwardly facing surface of the edge portion 3 of the upper housing member.

Figure 7:
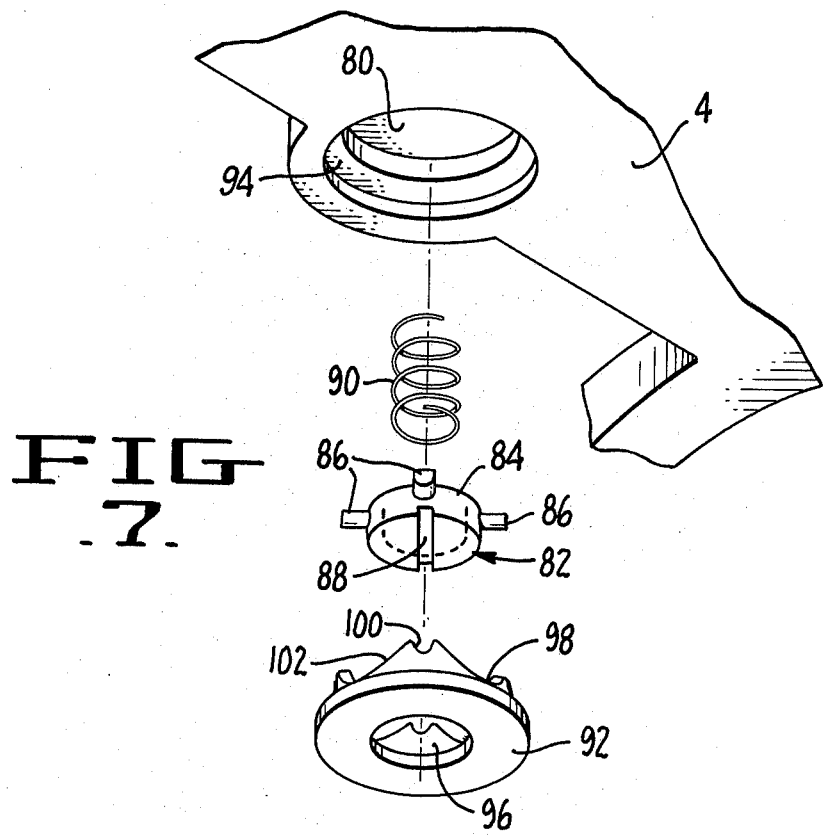
FIG. 7 is an exploded view of a reset button assembly incorporated in the cartridge of FIG. 1.
Figure 8:
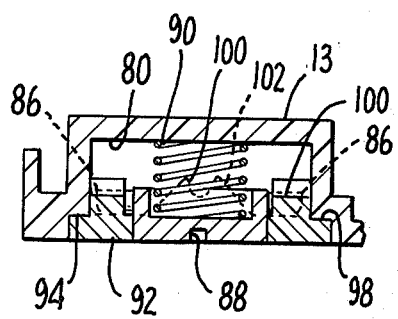
FIG. 8 is a side sectional view taken through the center of the reset button of FIG. 7, with the button in its extended position.
Figure 9:
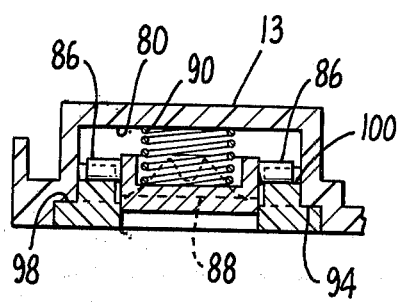
FIG. 9 is a sectional view taken through the center of the reset button assembly of FIG. 7 with the reset button in its retracted position.

Another feature of this improved disc cartridge may be found in the improved reset button illustrated in FIGS. 7, 8 and 9. FIG. 7 is an exploded view looking up at the underside of lower housing member 4. In FIG. 7 surface 80 is the base of a well or cage for receiving the reset button, the opposite side of surface 80 having been illustrated in FIG. 1 as surface 13. The reset button assembly comprises a reset button 82 having a disc-like body 84 with a plurality of lugs 86 projecting radially outwardly from it. Preferably, four such lugs 86 are positioned at equal 90° spacings about the perimeter of button body 84 and are positioned adjacent the upper surface and spaced from the downwardly facing surface thereof, as illustrated in FIG. 7. A slot 88 is provided in the button body 84 to receive means such as a screw driver or coin for rotating the button. A coil compression spring 90 is positioned between the button 82 and the base 80 of the reset button well. Both the button 82 and the spring 90 are retained within the well by the ring-like cage member 92 which is received into and affixed to the counterbore portion 94 of the well. This cage member 92 has a central aperture 96 slightly larger in diameter than the button body 84 so that the button body may project slightly therethrough and be rotatable within the aperture 96. The radially outward projection of lugs 86 restrain axially outward movement of the button 82 by engaging the inwardly facing portions 98 of the cage adjacent the aperture. Thus, it may be seen that the combination of the cage member 92 and the well provided in the underside of lower housing member 4 comprises a cage for restraining axial movement of the button 82 to predetermined limits while allowing rotational movement of the button about an axis through its center.

Attached to the cage member 92, and preferably molded integrally therewith are a plurality of detents 100 spaced inwardly of the back surface 98 of the cage member, with ramps 102 extending from the detents 100 to the cage member inwardly facing surface 98. Preferably, these detents 100 are equally spaced at 90° positions around the cage member 92 and are located and dimensioned to receive the lugs 86 of the button 82. Thus, when the button 82 is pushed inwardly of its cage, toward surface 80, and rotated to align lugs 86 with detents 100, the lugs will engage the detents and retain the button 82 in the retracted position spaced inwardly of the outer surface of cage member 92, as shown in FIG. 11. However, upon even slight rotation of the button 82 from its detent-engaging position, the lugs 86 will engage the ramps 102 on one side or the other of the respective detents. When the force urging the button inwardly of its case is removed, engagement of the lugs 86 with the ramps 102 under the influence of compression spring 90 will cause the lugs 86 to be cammed down the ramps 102 to a position engaging the inward surface 98 of the cage member 92. Thus, the button will be urged into the position illustrated in FIG. 8 with the outer surface of the button 82 generally flush with the outer surface of cage member 92. By the use of this structure it may be seen that, at any time the button lugs 86 are not brought into generally precise alignment with detents 100, their engagement with the ramps 102 and the above-described camming action will cause the button to seek its extended position. This is desirable since the function of the reset button is to prevent unintended erasure or recording on the disc at any time the button is in its extended position. Thus, the above described cartridge incorporating this improved reset button is protected against unintended erasure by the requirement that the button be carefully reset to the retracted position, thus significantly reducing the chance of accidental or unintended resetting.

While the foregoing describes a particularly preferred embodiment of the recording disc cartridge of this invention, it is recognized that numerous variations of the disclosed structure, all within the scope of the invention, will readily become apparent to those skilled in the art. Accordingly, the foregoing description is intended to be illustrative only of the principles of the invention and not limitative thereof, and the scope of the invention is to be limited solely by the claims appended hereto.

What is claimed is:

1. A cartridge for holding and protecting a magnetic recording disc during storage and use, comprising
    a lower housing member extending generally transversely of the recording disc axis and having an aperture for receiving a portion of the disc hub projecting therethrough;
    an upper housing member joined to said lower housing member and including an upwardly facing portion extending generally transversely of the recording disc axis and an edge portion extending downwardly from the periphery of said upwardly facing portion to a point adjacent said lower housing member, said edge portion having an opening therethrough for access by a recording head to the disc within;
    a recording head access door movable between a closed position extending transversely across a part of said upper housing member upwardly facing portion and downwardly across and covering said recording head access opening, and an open position deflected upwardly from said upper housing member and exposing said recording head access opening;
    a hinge pivotally operable about a single predetermined rotary axis for attaching said recording head access door to said upper housing member, whereby the head access door may be opened by rotatably pivoting about that single rotary axis;
    the transversely extending portion of said head access door comprising an upper door attached to said upper housing member, and the downwardly extending portion of said head access door comprising a separate outer door attached to said upper door adjacent said cartridge edge by means of a hinge pivotally operable about a single predetermined rotary axis such that said outer door may pivot about its rotary pivot axis outwardly of said cartridge edge; and
    said head access door further including means for limiting the pivotal movement of said outer door to a predetermined amount inwardly of normal to said upper door and means for resiliently urging said outer door toward the pivot limit inwardly of said cartridge, whereby undesired excess inward pivoting of the outer door may be prevented.

2. A cartridge according to claim 1 wherein said outer door in said closed position overlaps and abuts the radially outermost portion of said lower housing member adjacent said recording head access opening, whereby the outer door in its closed position may be urged toward abutting engagement with the lower housing member to close the cartridge against external contaminants.

3. A cartridge according to claim 2 further comprising a lip on said outer door spaced above the lowermost portion of said outer door and extending inwardly of said cartridge for overlapping the upwardly facing portion of said lower housing member adjacent said recording head access opening when said outer door is in said closed position, whereby the outer door in its closed position may form an overlapping and abutting seal to close the cartridge against external contaminants.

4. A cartridge according to claim 2 further comprising a compression spring operatively connected to said upper door for urging said upper door toward a closed position.

5. A cartridge according to claim 1 further comprising a plurality of disc movement restraining members projecting upwardly from the upwardly facing portion of said lower housing member for restraining axially transverse movement of said disc.

6. A cartridge according to claim 5 wherein said disc movement restraining members are located adjacent said disc hub-receiving aperture and radially outward of the hub of said disc to restrain axially transverse movement of said disc hub.

7. A cartridge for holding and protecting a recording disc during storage and use, comprising
    a lower housing member extending generally transversely of the recording disc axis and having an aperture for receiving a portion of the disc hub projecting therethrough;
    an upper housing member joined to said lower housing member and including an upwardly facing portion extending generally transversely of the recording disc axis and an edge portion extending downwardly from the periphery of said upwardly facing portion to a point adjacent said lower housing member, said edge portion having an opening therethrough for access by a recording head to the disc within;
    a recording head access door movable between a closed position extending transversely across a part of said upper housing member upwardly facing portion and downwardly across and covering said recording head access opening, and an open position deflected upwardly from said upper housing member and exposing said recording head access opening;
    a hinge pivotally operable about a predetermined axis for attaching said recording head access door to said upper housing member, whereby the head access door may be pivotally opened; and
    a reset button assembly comprising
        a selectively positionable reset button including a body and a plurality of lugs projecting radially outwardly from said body,
        a cage for restraining axial movement of said reset button to predetermined limits while allowing rotational movement thereof about an axis through the center of said button body, said cage including a member having an aperture for rotatably receiving said button body therethrough with the inwardly facing portions of said cage member adjacent the edges of said aperture positioned to engage said button lug to restrain axially outward movement of said button, and means for selectively and releasably holding said button body in either an extended position generally flush with the outer surface of said cage member with said lugs engaging said cage member inwardly facing portions, or a retracted position inset from said cage member outer surface with said lugs engaging detent means spaced inwardly of said cage member, said holding means including spring biasing means urging said button body toward said extended position and ramp means extending from said detent means to said cage member inwardly facing portions, whereby, when the button lugs are out of engagement with the detent means, the spring biasing means may urge the lugs along the ramp means toward the extended position with the lugs engaging the cage member.

* * * * *